United States Patent [19]

MacKenzie et al.

[11] Patent Number: 5,215,942
[45] Date of Patent: Jun. 1, 1993

[54] DIAMOND-CONTAINING CERAMIC COMPOSITES AND METHODS OF MAKING SAME

[75] Inventors: John D. MacKenzie; Edward J. A. Pope, both of Los Angeles, Calif.

[73] Assignee: The Regents of the University of California, Alameda, Calif.

[21] Appl. No.: 232,359

[22] Filed: Aug. 15, 1988

[51] Int. Cl.$^5$ .............................................. C03C 14/00
[52] U.S. Cl. ...................................... 501/12; 501/99; 501/154
[58] Field of Search .................... 501/12, 99, 100, 154

[56] References Cited

U.S. PATENT DOCUMENTS

| | | | |
|---|---|---|---|
| 4,377,507 | 3/1983 | Pope et al. | 501/12 |
| 4,680,048 | 7/1987 | Motoki et al. | 501/12 |
| 4,681,615 | 7/1987 | Toki et al. | 501/12 |
| 4,695,321 | 9/1987 | Akashi et al. | 501/99 |
| 4,710,227 | 12/1987 | Harley et al. | 501/12 |

OTHER PUBLICATIONS

Yoldas, "Preparation of Glasses and Ceramics from Metal-Organic Compounds", J. Mat. Sci. 12(1977), pp. 1203-1208.

*Primary Examiner*—David Brunsman
*Attorney, Agent, or Firm*—Robbins, Dalgarn, Berliner & Carson

[57] ABSTRACT

Diamond-containing ceramic composites useful as substrates and the like in the electronics industry as well as for abrasive and cutting applications and methods of making same are disclosed. More specifically, the sol-gel process is used to fabricate the composites by combining water, an organometallic precursor compound, alcohol or similar solvent between the water and the precursor compound, a catalyst, diamond powder and a thickening agent to form a moldable, wet, porous gel which can be dried at a temperature below the boiling point of any of the gel liquids to form a stabilized porous composite. The stabilized porous composite can be densified, by heat, in an essentially oxygen-free atmosphere to form a diamond-containing ceramic composite having low porosity.

21 Claims, No Drawings

DIAMOND-CONTAINING CERAMIC COMPOSITES AND METHODS OF MAKING SAME

This invention was made with government support under AFOSR-84-0022 awarded by the Air Force. The Government has certain rights in this invention.

FIELD OF THE INVENTION

The present invention relates to the use of a sol-gel method of fabricating porous and dense diamond-containing ceramic composites useful in electronic and abrasive applications.

BACKGROUND OF THE INVENTION

The word "ceramics" is derived from the Greek word keramos ("burnt stuff"), and traditionally encompasses most inorganic materials except metals. Traditional ceramics are derived from the base material clay, an essentially hydrated compound of aluminum and silicon $H_2Si_2O9$, containing more or less foreign matter such as ferric oxide, silica (as sand) and calcium carbonate (as limestone). An important and growing area of the ceramic field, is ceramic composites. This area covers a variety of combinations such as sapphire, aluminum oxide, whiskers in metals, metal-bonded carbides used in the machine tool industry, and directionally solidified two-phase ceramic systems (wherein an oriented fibrous second phase is grown in a primary matrix phase to maximize in a selected direction various important characteristics, such as minimum long-term, high-temperature creep).

Ceramic composites have a variety of uses such as in electrically insulating integrated circuit packages and substrates, where aluminum oxide dominates the field. The lightweight characteristics of ceramic composites are being touted as valuable for high-temperature engines for future automobiles. Further, the hardness of certain ceramic materials may permit their usage as cutting tools for abrasive uses such as grinding.

A chemical technique for producing ceramic composites that is used in the present invention is known as sol-gel processing. Unlike traditional glass and ceramic processing techniques in which powders are reacted or melted at high temperatures, the sol-gel process relies upon hydrolysis and condensation reactions in liquid solution at near ambient temperatures. Typically, a precursor, solvent, water and a catalyst are mixed together in solution. The sol is a suspension of small particles (colloids) ranging in size from about 1 to 100 nanometers. On partial loss of the liquid phase, the sol increases in viscosity, eventually becoming a wet, porous gel. The gel is composed of an interconnected porous matrix phase which initially contains alcohol, unreacted precursors and water. This wet, porous gel is subjected to additional processing stages where it is dried and densified to produced desired ceramic composite characteristics. For example, the wet, porous gel can be simply dried to form a porous solid or further converted into a dense glass or ceramic.

Aluminum oxide is a material commonly used in electronic substrates, i.e., hybrid circuit boards for integrated circuits. Aluminum oxide is an excellent insulator having a resistivity which is greater than $10^{14}$ Ohm-cm. As an electrical insulator, the aluminum oxide acts to prevent the various circuit elements from transmitting undesired electrical current to each other and creating a short circuit. However, it is often desirable to have an electronic substrate with a high thermal conductivity. That is to say, the substrate has the ability to dissipate the heat generated when current is passed through the circuit elements, thus providing a modicum of protection for the fairly sensitive resistors against the temperature increases, as well as preventing the burnout of circuit leads. Unfortunately, aluminum oxide has a low thermal conductivity. Additionally, it is also desirable that an electronic substrate have a low dielectric constant, i.e., the substrate should not act, in general, as a capacitor. In this regard, the dielectric constant of aluminum oxide is 9.

Dense, alumina-based ceramic materials are also known to be useful as abrasive grains. An example of alumina-based ceramic materials made by a sol-gel process is illustrated in U.S. Pat. No. 4,574,003, wherein the gel is dewatered to form a dried solid which is cut or machined to form a desired shape or crushed or broken by any suitable means to form abrasive particles or grains for industrial application.

Glass is a very important part of ceramics. The glass industry is the largest single element of the entire ceramic industry and glassy portions of many ceramic bodies are the bond that hold many ceramics together. Probably the majority of ceramics produced are a mixture of crystalline grains and a glassy phase, with the glass frequently acting as the bond. This is the basis of the vitrified-grinding wheel industry in much of the structural and whiteware branches of the ceramics industry. The cutting tool and abrasives industry is also desirous of obtaining new and better cutting and grinding tools.

Diamond, the hardest known natural material, also is an electric insulator, has a high thermal conductivity and possesses a low dielectric constant, qualities desirable and useful in connection with both abrasive applications and in electronic substrates. The use of diamond itself as either a grinding wheel or an electronic substrate is clearly cost prohibitive, whether the diamond is naturally occurring or is less expensive commercially available diamond powder or diamond chips (a by-product of processing natural diamonds) which then would need to be fused into such a grinding wheel or compressed into a substrate. Hence, it would be desirable to incorporate diamond, whether synthetic or natural, into a less expensive material, such as a ceramic, to produce a diamond-based composite that could, with appropriate modification for each application, be useful in the electronics industry or as an abrasive.

The incorporation of diamond particles into ceramics by conventional processing is extremely difficult. In such a conventional process, the raw materials, usually with clay or, with respect to ceramic substrates, aluminum oxide as the main or base material, are fired to a point where the base material undergoes a gradual change from the crystalline to the glassy state, the rate depending upon the time of heating and the temperature to which it is subjected. The fusion point of the raw materials varies from feldspar at 1300° C., to kaolin (pure clay) at an order of about 1700° C. to aluminum oxide at 2015° C. Unfortunately, diamond decomposes to graphite (which acts as an electrical conductor and would not be useful in electronic substrates) above about 1000° C. Moreover, diamond oxidizes at temperatures above about 600 C. to form carbon monoxide or carbon dioxide in the presence of oxygen. In making silica glass, for example, powdered quartz (beach sand of high quality) is melted at temperatures of between 2000° and 2500. C., at which temperatures diamond is highly unstable. Additionally, conventional casting requires the use of special high temperature molds. Thus, the prior art has developed, and now uses, methods of depositing or otherwise affixing diamond or in other cases abrasive layers such as aluminum oxide only on the outer periphery of grinding wheels and other such abrasive or cutting instruments.

In general, materials that are good thermal conductors are also good electrical conductors, and hence the electronic substrate industry has yet to find a material having all three properties simultaneously, i.e., a high thermal conductivity, a low dielectric constant and the ability to act as an electric insulator.

It is a feature of the present invention to provide a material with a high thermal conductivity, a low electrical conductivity, and a low dielectric constant which is useful for electronic substrates such as hybrid circuit boards for integrated circuits.

It is another feature of the present invention to provide a very hard material having cutting and abrasive characteristics useful in grinding and cutting applications.

It is yet another feature of the present invention to provide a very hard ceramic material having high thermal conductivity characteristics, is lightweight, can be made with low temperature molds and is useful for high-temperature engines and engine parts for automobiles.

SUMMARY OF THE INVENTION

The present invention relates to diamond-containing ceramic composites and methods for making same. More specifically, a liquid sol-gel solution and diamond powder are combined together with a thickening agent, or other means of dispersing the diamond powder in the solution to form a wet, porous gel. While in the wet, porous gel state, the material is readily shaped for various uses. For example, the wet, porous gel may be placed in a mold, extruded, or spread out in a desired shape and permitted to dry at a temperature sufficiently low to prevent cracking, typically room temperature to 50° C. The resultant dry, porous gel may be densified at a temperature sufficiently low to prevent graphitization or oxidation of the diamond. This is preferably done by vacuum densification or densification in a helium atmosphere at a temperature generally ranging from 600° C. to 1100° C. The composition of the sol-gel solution (including the catalyst used), the amount of diamond powder, the thickening agent and the intensity and length of the drying and heating stages may be varied to produce diamond-containing ceramic composites having various density and abrasion characteristics.

DESCRIPTION OF THE PREFERRED EMBODIMENTS

The sol-gel process involves the mixing of liquids which will harden with time to form porous gels. The sol-gel process can be viewed as a sequence of interrelated reactions. The first process involves the solution chemistry reactions of hydrolysis and polymerization. The second reaction, gelation, depends on the rate of hydrolysis and polymerization, as well as precursor functionality, concentration and pH to determine the resulting gel structure. The gel structure, which can be defined by its properties such as particle size, pore size, degree of polymerization and homogeneity of mixing if more than one metal atom is involved, will in turn affect the drying behavior of the gel and the resultant physical properties such as porosity, pore size and distribution and matrix density. Finally, densification and crystallization behavior depends upon the composition of the dried gel, surface area, porosity, etc. The net result being that each of these reactions is sequentially dependent upon the previous reaction.

In principle, any combination of liquids can be mixed to form oxides with different chemical compositions. For instance, an aluminum alkoxide can be used to form an aluminum oxide gel. On heating, the water, organics, and other volatiles will be disposed of and a porous aluminum oxide results. On heating to higher temperatures, the porous oxide can be densified to a practically pore-free ceramic. A second example is the use of a magnesium alkoxide and an aluminum alkoxide to form a magnesium aluminate spinel. The porosity of the oxide gel and hence, the heat-treated ceramic can be controlled from greater than 90% to 0% and the pore size distributions can also be controlled. This process involves temperatures much lower than those needed for conventional ceramic processing. If a glass forming oxide is used, glasses can also be made at relatively low temperatures.

The present invention is concerned with the dispersion of diamond powder into sol-gel liquid solutions. After gelling, the diamond particles are surrounded by the oxide. Thus, if diamond powder is dispersed in an aluminum alkoxide sol-gel solution, the resultant composite is a diamond-aluminum oxide composite. At relatively low temperatures of firing, the composite can be porous. As the firing temperature is increased, a denser composite is made.

In one embodiment of the present invention, water, an organometallic precursor compound which can be hydrolyzed in an aqueous solution, a solvent between the precursor compound and the water such as alcohol, and a catalyst are combined with diamond powder and a thickening agent to form a wet, porous gel starting material.

The organometallic precursor compound is preferably a metal with a ligand alkoxide. The choice of precursor depends upon a number of factors such as reaction time, solution solubility and the desired microstructure of the final product (i.e., porosity, pore size and distribution, surface area, etc.). Two readily available and acceptable organometallic precursor compounds useful in the present invention are tetramethoxysilane and tetraethoxysilane.

There are no specific requirements for the solvent to be used other than not otherwise interfering with the reaction. One such class of solvents generally are alcohols. Readily available, cost effective alcohols useful as solvents in the present invention include ethanol, methanol, propanol and butanol. However, other solvents can also be used, such as formamide.

In order to speed up the sol-gel process reaction time, a catalyst will be generally preferred, if not required. Examples of acceptable catalysts are simple acids or bases such as hydrofluoric acid, hydrochloric acid, nitric acid, sulfuric acid, acetic acid and ammonium hydroxide. The type and amount of acid or base used may be varied depending upon the results desired. The catalyst used will have a significant effect on both gelation time and the properties of the resultant gel and solid. The effects seen will correspond to the degree of variation of pH, the relative dissociation of each catalyst, and the particular mechanism employed by each catalyst.

Acid catalyzed hydrolysis is an electrophilic reaction that can be expressed by the following two equations:

$$(RO)_3SiOR + H_3O^+ \rightarrow (RO)_3SiOH + H^+ + HOR \quad (1)$$

$$H^+ + H_2O \rightarrow H_3O^+ \quad (2)$$

The reaction rate is governed by the concentration of hydronium in solution; the lower the pH, the faster the rate of reaction.

In base catalyzed hydrolysis, a nucleophilic substitution of hydroxyl ions for OR groups occurs as expressed by the following two equations:

$$(RO)_3SiOR + OH^- \rightarrow (RO)_3SiOH + OR^- \quad (3)$$

$$OR^- + H_2O \rightarrow HOR + OH^- \quad (4)$$

The rate of base catalyzed hydrolysis is governed by the hydroxyl concentration in the solution.

Where the precursor is a silica-containing compound, it has been found that hydrofluoric acid is a particularly effective catalyst. In fluorine catalyzed gels, the rapid gelation kinetics are probably due to the formation of a highly unstable, pentacovalent activated intermediate by the fluorine anion and the silicon precursor. This intermediate rapidly decomposes to form a partially fluorinated silicon alkoxide and in the presence of $H_3O^+$, yields byproducts and water and alcohol. Another pentacovalent complex is formed in the presence of water that decomposes into a partially hydrated silicon alkoxide plus regenerated fluorine and hydronium. Thus, the catalytic mechanism and the gelation time will each have an effect on the resulting microstructures and properties of the dried and fired silica.

The diamond powder which is combined with the sol-gel solution may vary in grade depending upon the desired effect. In the examples illustrated hereinafter in Tables II and III, a commercial grade of approximately 0.10 micron in size or larger was utilized. Table I illustrates the thermal conductivity for diamond and certain selected materials. The thermal conductivity of diamond is clearly superior to these materials, including silica glass and alumina ceramic. Hence, the thermal conductivity of the end product of the present invention will increase with the amount of diamond and the proximity of the diamond particles to each other. Additionally, the greater the volume of diamond, the greater the abrasive characteristics.

TABLE I

| THERMAL CONDUCTIVITY OF SELECTED MATERIALS | |
|---|---|
| Material | Thermal Conductivity (cal/cm.s. °K.) |
| Diamond | 5.540 |
| Alumina Ceramic | 0.072 |
| Silica Glass | 0.004 |
| Copper | 0.960 |
| Iron/Steel | 0.190 |
| Stainless Steel | 0.072 |
| Aluminum | 0.570 |

The diamond powder must be dispersed throughout the wet, porous gel, and typically, would otherwise fall to the bottom of the gel in a matter of minutes unless a thickening agent or other means is used to disperse the powder therein. Some examples of useful thickening agents are organic glucose, organic dextrose, organic proteins, various cellulose derivatives and fumed silica powder. With respect to the organic products, they should be able to evaporate, pyrolyze or decompose during the heating processes and not interfere with the final product. The fumed silica powder does not burn away but is chemically compatible with the end composite.

Another way to disperse the diamond powder in the wet, porous gel, is by adjusting the pH of the gel. In colloidal chemistry, one can stabilize particles by imputing an electro-repulsive charge on the surface of the particles through adjustment of the pH to attain the isoelectric point, i.e., where the particles repel each other. This effect is also a function of size of the particles, and hence dependent upon the size of the diamond particles used.

The diamond-containing wet porous gel can be placed in the desired mold or extruded, etc. and dried at a temperature ranging from about room temperature to a point just below the boiling point of the liquids in the gel pores. A preferred temperature range is room temperature to 50° C. The reason for this preference is that below room temperature the rate of drying increases whereas the higher the temperature, the faster the gel dries and the greater the likelihood of cracking. An additional advantage to using the sol-gel process is the ability to use low-temperature molds during this forming stage. The result is a stabilized porous composite that is generally useful as an abrasive porous material or ready for additional processing.

This stabilized porous composite can be densified by the application of heat. To avoid oxidation the densification step is preferably accomplished outside the presence of oxygen. Two preferred methods to prevent oxidation are (1) vacuum densification and (2) densification in an inert atmosphere such as a helium atmosphere. Densification is accomplished at temperatures between the "drying" temperature and about 1100° C. Preferably the densification temperature will be between 600° C. and 1000° C. and will at least in part be dictated by the densification method and environment, the characteristics of the stabilized porous composite being densified, and the desired degree of porosity.

Now turning to Table II, a 5% by volume diamond-sodium silicate composite was fabricated. The wet, porous gel was composed of 18.5 ml of a 30 weight percent sodium methoxide in methanol solution; 42.1 ml of tetramethoxysilane, 66.6 ml of methanol and 10.2 ml of water, to which was added 5.3 grams of fumed silica powder and 2.0 grams of diamond powder (9 micron in size). Due to the high reactivity, rate attendant to the sodium methoxide in methanol solution, no catalyst was required. The resultant gel was permitted to dry at 60° C. for a period of one week. The dried gel was then densified at 1100° C. for a period of two hours in a vacuum. The resultant physical properties of the diamond-containing ceramic composite indicated an open porosity of 2.6%, an apparent density of 2.56 grams per cc and a theoretically calculated density of 2.57 grams per cc. Table II also indicates weight percent, mole percent and volume percent for each of diamond, fumed silica and sodium-silicate glass.

TABLE II 5 v/o Diamond-Containing Sodium Silicate Composite

1. Solution Components
   18.5 ml 30w/o Na-methoxide in methanol
   42.1 ml TMOS TABLE II-continued

| 5 v/o Diamond-Containing Sodium Silicate Composite |
|---|
| 66.6 ml methanol |
| 10.2 ml water |
| 5.3 gm Cab-O-Sil TM fumed silica powder* |
| 2.0 gm diamond (9 micron) |
| 2. Processing |
|   a) dried at 60° C./1 week |
|   b) densification 1100° C./2 hours/vacuum |
| 3. Physical Properties |
|   a) 2.6% open porosity |
|   b) apparent density = 2.56 gm/cc |
| 4. Theoretically Calculated Density |
|   a) by rule of mixtures, density = 2.57 gm/cc |

| Component | w/o | m/o | v/o |
|---|---|---|---|
| Diamond | 7.4 | 28.5 | 5.0 |
| Cab-O-Sil | 19.6 | 15.0 | 20.0 |
| Sodium-silicate glass | 73.1 | 56.5 | 75.0 |

*Available from Cabot Corporation of Waltham, Mass.

Table III illustrates the fabrication of a diamond-containing silica glass composite. Tetraethoxysilicate, ethanol, water and hydrofluoric acid are combined with a fumed silica and diamond powder to produce a wet, porous gel. This wet, porous gel was then dried at a temperature of 50° C. for a period of two weeks resulting in a final composition that comprises 33 weight percent diamond and 67 weight percent silica glass. The porosity of the dried and now stabilized porous composite was 71%. Densification at temperatures of 986° C. resulted in a composite containing less than 6% porosity. Finally, densification at 1013° C. reduced the porosity to 3%. Some graying on the outermost layer of the sample indicated very minor graphitization during both densification processes. Heat treatment at even higher temperatures could further reduce porosity, however, at the expense of greater graphitization of the diamond phase.

TABLE III

| Diamond-Containing Silica Glass Composite | | |
|---|---|---|
| 1. Initial Solution Composition: | | |
| TEOS | 21.03 | ml |
| Ethanol | 22.05 | ml |
| Water (distilled, de-ionized) | 6.81 | ml |
| HF (48% conc.) | 0.25 | gm |
| Cab-O-Sil fumed silica | 2.25 | gm |
| Diamond Powder (9 micron) | 2.25 | gm |
| 2. Final Composition | | |
| | Weight % | Volume % |
| Diamond | 33 w/o | 24 |
| Silica Glass | 67 w/o | 76 |
| 3. Densification | | |
| Temperature | Porosity | |
| 25° C. | 71% | |
| 986° C. | 6% | |
| 1013° C. | 3% | |

While particular embodiments of the invention have been described, it will be understood that the invention is not limited thereto since modifications may be made and will become apparent to those skilled in the art. For example, a metal alkoxide which is immiscible with water, such as tetraethoxysilane, could be mechanically mixed with the water, such as by ultrasonic vibration as very rapid stirring, sufficient to cause the tetraethoxysilane to hydrolyze and produce ethanol which will act as the solvent to continue the sol-gel process.

What is claimed is:

1. A method of making a densified diamond-containing ceramic composite comprising:
   mixing diamond powder with a sol-gel solution of an organometallic precursor of a ceramic composition to produce a mixture;
   gelling the mixture to produce a wet, porous gel with diamond powder dispersed throughout the gel;
   drying the wet, porous gel at a temperature not to exceed the boiling point of liquids remaining in the gel to produce a stabilized porous composite; and
   heating the stabilized porous composite to produce a densified diamond-containing ceramic composite at a temperature sufficiently low to substantially prevent graphitization of the diamond.

2. The method of claim 1, wherein the diamond powder is dispersed throughout the sol-gel solution by mixing a thickening agent with said diamond powder and said sol-gel solution to form the wet, porous gel.

3. The method of claim 2, wherein the thickening agent is selected from the group consisting of organic glucoses, organic dextroses, organic proteins and cellulose derivatives which will evaporate, pyrolyze or decompose during the drying and heating stages.

4. The method of claim 2, wherein the thickening agent is fumed silica powder.

5. The method of claim 1, wherein the organometallic precursor is a metal with a ligand alkoxide.

6. The method of claim 5, wherein the organometallic precursor is selected from the group consisting of tetraethoxysilane and tetramethoxysilane.

7. The method of claim 1 wherein said sol-gel solution is formed by combining said organometallic precursor with water and a solvent therebetween.

8. The method of claim 7, wherein the solvent is an alcohol.

9. The method of claim 8 wherein the alcohol is selected from the group consisting of ethanol, methanol, butanol and propanol.

10. The method of claim 2, wherein a catalyst is combined with the organometallic precursor, water, solvent, diamond powder and thickening agent.

11. The method of claim 10, wherein the catalyst is selected from the group consisting of hydrofluoric acid, nitric acid, sulfuric acid, acetic acid, hydrochloric acid and ammonium hydroxide.

12. The method of claim 1, wherein the wet, porous gel is dried at a temperature not to exceed 50° C.

13. The method of claim 1, wherein the stabilized porous composite is densified by heating same in a vacuum at a temperature between 600° C. to 1100° C.

14. The method of claim 1, wherein the stabilized porous composite is densified in a helium atmospheric environment by applying heat in the range of between 600° C. and 1100° C.

15. A method of making densified diamond-containing ceramic composites comprising:
   combining water, an organometallic precursor of a ceramic composition, an alcohol to act as a solvent therebetween, a catalyst, diamond powder and a thickening agent to form a wet, porous gel;
   drying the wet, porous gel at a temperature not to exceed the boiling point of liquids remaining in the gel to produce a stabilized porous composite; and
   heating the stabilized porous composite in a substantially oxygen-free atmosphere to a temperature between 600° C. and 1100° C. to produce a densified diamond-containing ceramic composite.

16. The method of claim 15, wherein the thickening agent is selected from the group consisting of organic glucoses, organic dextroses, organic proteins and cellulose derivatives which will evaporate, pyrolyze or decompose during the drying and heating stages.

17. The method of claim 15, wherein the thickening agent is fumed silica powder.

18. The method of claim 15, wherein the organometallic precursor is selected from the group consisting of tetraethoxysilane and tetramethoxysilane.

19. The method of claim 18, wherein the catalyst is hydrofluoric acid.

20. The method of claim 1, wherein the stabilized porous composite is heated in a substantially oxygen free atmosphere.

21. The method of claim 1, wherein the stabilized porous composite is heated to a temperature in the range of between about 600° C. and about 1100° C.

* * * * *

UNITED STATES PATENT AND TRADEMARK OFFICE
CERTIFICATE OF CORRECTION

PATENT NO. : 5,215,942
DATED : June 1, 1993
INVENTOR(S) : MacKenzie et al.

It is certified that error appears in the above-identified patent and that said Letters Patent is hereby corrected as shown below:

Col. 1, line 58, delete "produced" and insert --produce--.

Col. 2, line 65, after "600" insert --°--.

Col. 3, line 2, after "2500" insert --°--.

Signed and Sealed this

Twenty-second Day of February, 1994

Attest:

BRUCE LEHMAN

*Attesting Officer*         *Commissioner of Patents and Trademarks*